(No Model.)

H. C. LOHFF.
CORN PLANTER.

No. 460,588.   2 Sheets—Sheet 1.

Patented Oct. 6, 1891.

Witnesses
M. Fowler
Wm. Bagger

Inventor
Hans C. Lohff
By his Attorneys,
C. A. Snow & Co.

(No Model.) 2 Sheets—Sheet 2.

H. C. LOHFF.
CORN PLANTER.

No. 460,588. Patented Oct. 6, 1891.

Witnesses
M. Fowler
Wm. Bagger

Inventor
Hans C. Lohff
By his Attorneys,
C. A. Snow & Co.

THE NORRIS PETERS CO., PHOTO-LITHO., WASHINGTON, D. C.

UNITED STATES PATENT OFFICE.

HANS C. LOHFF, OF FRANKLIN, NEBRASKA.

CORN-PLANTER.

SPECIFICATION forming part of Letters Patent No. 460,588, dated October 6, 1891.

Application filed May 23, 1891. Serial No. 393,869. (No model.)

*To all whom it may concern:*

Be it known that I, HANS C. LOHFF, a citizen of the United States, residing at Franklin, in the county of Franklin and State of Nebraska, have invented a new and useful Corn-Planter, of which the following is a specification.

This invention relates to check-row corn-planters; and it has for its object to construct a machine of this class by means of which the corn may be dropped in check-rows automatically and without the use of any check-row wire, cord, chain, or any similar guiding device.

The invention consists in the improved construction, arrangement, and combination of parts, which will be hereinafter fully described, and particularly pointed out in the claims.

Figure 1:
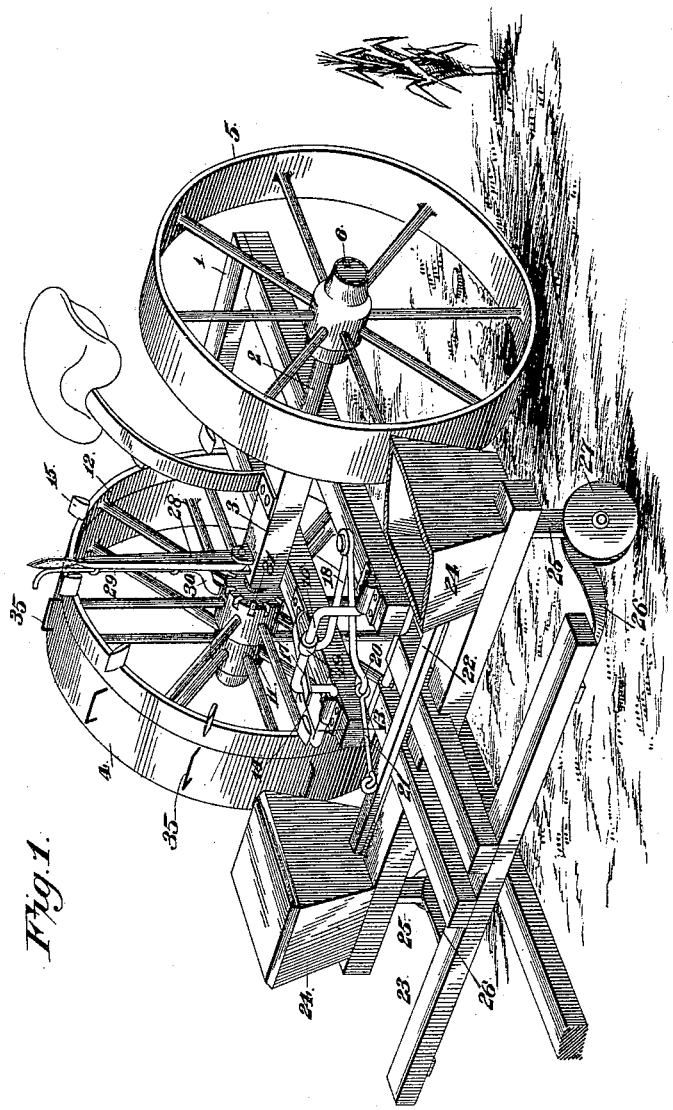
Figure 2:
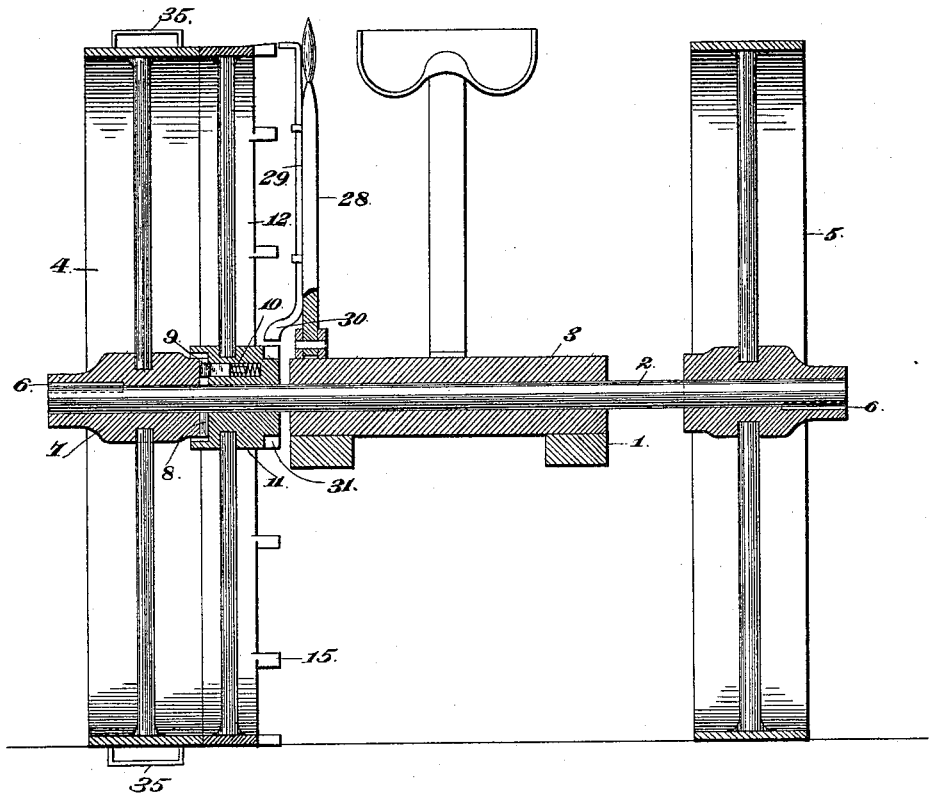
Figure 3:
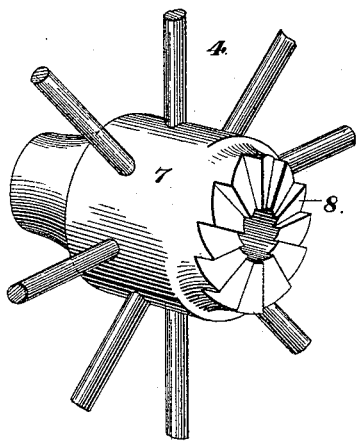

In the drawings hereto annexed, Figure 1 is a perspective view of a check-row corn-planter constructed in accordance with my invention. Fig. 2 is a vertical transverse sectional view taken through the axle of the machine. Fig. 3 is a perspective detail view.

Like numerals of reference indicate like parts in all the figures.

1 designates the frame of the machine, having the axle 2, which extends through and is mounted revolubly in the cross-bar 3, which connects the side pieces of the frame. The ends of the axle carry the transporting-wheels 4 and 5, which are secured upon said axle by means of the keys 6. The hub 7 of the transporting-wheel 4 is provided on its inner face with a circumferential series of ratchets 8, adapted to engage a spring-actuated pawl 9, which is mounted slidingly in a transverse recess 10 in the hub 11 of an auxiliary wheel 12, which is mounted revolubly upon the axle adjacent to the transporting-wheel 4. When the machine passes in a forward direction, the ratchets upon the hub of the wheel 4 will engage the pawl mounted in the hub of the wheel 12 and cause the latter to revolve with the transporting-wheels and axle. When the machine is backed, the ratchets will slip idly over the pawl and the wheel 12 need not revolve.

Upon the front end of the frame 1 is mounted a rock-shaft 13, having a crank 14, lying in the path of a series of pins or tappets 15, that extend laterally in an inward direction from the rim of the wheel 12. The rock-shaft 13 is also provided with a crank 16, which is normally held in an upright position by the action of a spring-arm 17, thus holding the crank or arm 14 in the path of the tappets.

18 designates an angle-lever, which is mounted pivotally upon one of the side beams of the frame 1, and one of the arms of said lever is provided at its forward end with a link or collar 19, encircling the crank 16, and mounted slidingly on the latter so that when the rock-shaft is oscillated a vibrating motion will be imparted to the lever 18. The other arm of the lever is provided at its outer end with an eye 20, which is connected by a link 21 with the seed-slide 22, which is mounted to reciprocate transversely upon the seeder-frame 23, which latter is hinged to the front end of the frame 1. Said seeder-frame has the seed-boxes 24 and the seed-tubes 25, which are connected with the runners or furrow-openers 26, and to the outer side of which are journaled the disks 27, which assist in opening the furrows and in holding the soil back while the seed is being dropped.

Upon the block or cross-piece 3 of the main frame 1 is mounted a lever 28, having a vertically-sliding rod 29, provided at its lower end with a catch 30, adapted to engage a circumferential series of ratchets 31, formed upon the hub of the wheel 12. By this means the said wheel 12 may be partly rotated and set at the proper position to begin operation after the machine has been turned at the end of the field. The said wheel 12 may be provided with any desired number of tappets, according to the diameter of said wheel and to the distance at which the hills are desired to be apart.

To the rim of the wheel 4 is attached a series of staples 36, projecting a suitable distance—say, two inches—beyond the rim of said wheel, for the purpose of preventing the latter from sliding.

The operation of my invention will be readily understood. When the machine progresses over the field the tappets 5 will engage the arm 14 of the shaft 16, oscillating the latter and transmitting motion to the seed-slide, thus operating the latter at equal intervals.

The construction of the device is simple, and it may be very easily operated without requiring special skill or experience.

Having described my invention, what I claim is—

1. In a check-row corn-planter, the combination of the frame, the axle extending through and journaled in a cross-bar of said frame, the transporting-wheels keyed upon the ends of the axle, one of said transporting-wheels being provided on the inner side of its hub with a circumferential series of ratchets, an auxiliary wheel journaled adjacent to the same and having a spring-actuated pawl mounted in its hub to engage said ratchets, tappets extending laterally from the rim of said auxiliary wheel, a rock-shaft having an arm lying in the path of said tappets, and mechanism for transmitting motion from said rock-shaft to the seed-slide, substantially as set forth.

2. The combination of the frame having the revolving axle, the transporting-wheels keyed upon the latter, the auxiliary wheel having laterally-extending tappets, a spring-actuated pawl engaging ratchets upon the hub of the adjacent transporting-wheel, and the lever having a sliding rod provided with a catch adapted to engage ratchets near the inner end of the hub of the auxiliary wheel, substantially as and for the purpose set forth.

3. The combination of the frame, the revolving axle, the transporting-wheels keyed upon the latter, the auxiliary wheel having laterally-extending tappets and adapted to be connected with the adjacent transporting-wheel by pawl-and-ratchet mechanism, the rock-shaft having an arm sliding in the path of the tappets, a spring engaging a crank formed upon said rock-shaft, an angle-lever provided at the end of one of its arms with a collar mounted slidingly upon the crank of the rock-shaft, the seed-slide mounted to reciprocate transversely upon the seeder-frame, and a link connecting said seed-slide with the other arm of the angle-lever, substantially as and for the purpose set forth.

In testimony that I claim the foregoing as my own I have hereto affixed my signature in presence of two witnesses.

HANS C. LOHFF.

Witnesses:
JAMES GREENWOOD,
JAMES EDGHILL.